United States Patent [19]

Grams

[11] 4,369,006

[45] Jan. 18, 1983

[54] PNEUMATIC CONVEYING SYSTEM

[75] Inventor: Wolfgang Grams, Herne, Fed. Rep. of Germany

[73] Assignee: Saarberg & Dr. C. Otto Gesellschaft fur Kohledruckvergasung mbH, Volklingen-Furstenhausen, Fed. Rep. of Germany

[21] Appl. No.: 186,222

[22] Filed: Sep. 11, 1980

[30] Foreign Application Priority Data

Sep. 21, 1979 [DE] Fed. Rep. of Germany ....... 2938323

[51] Int. Cl.$^3$ ............................................. B65G 53/40
[52] U.S. Cl. ...................................... 406/93; 406/133
[58] Field of Search ................. 406/132, 93, 127, 133, 406/142, 143, 191, 196, 193

[56] References Cited

U.S. PATENT DOCUMENTS

| 1,668,855 | 5/1928 | Ludlum | 406/193 |
| 2,718,435 | 9/1955 | Hudspeth | 406/133 X |
| 3,260,285 | 7/1966 | Vogt | 406/192 X |
| 3,449,016 | 6/1969 | Knowles | 406/132 |
| 3,733,012 | 5/1973 | Gron | 406/133 |

Primary Examiner—John J. Love
Assistant Examiner—Gene A. Church
Attorney, Agent, or Firm—Thomas H. Murray

[57] ABSTRACT

A pneumatic conveying pipe extending through fine-grained material in a pressurized storage tank and having ports in its side wall through which fine-grained material is forced by pressure in the storage tank. After being forced through the ports, the fine-grained material is conveyed along the pipe by an airstream. An annular valve abuts the inner periphery of the conveying pipe and is movable along the axis of the pipe from a position where it covers the ports to a position where the ports are exposed.

5 Claims, 1 Drawing Figure

U.S. Patent  Jan. 18, 1983  4,369,006
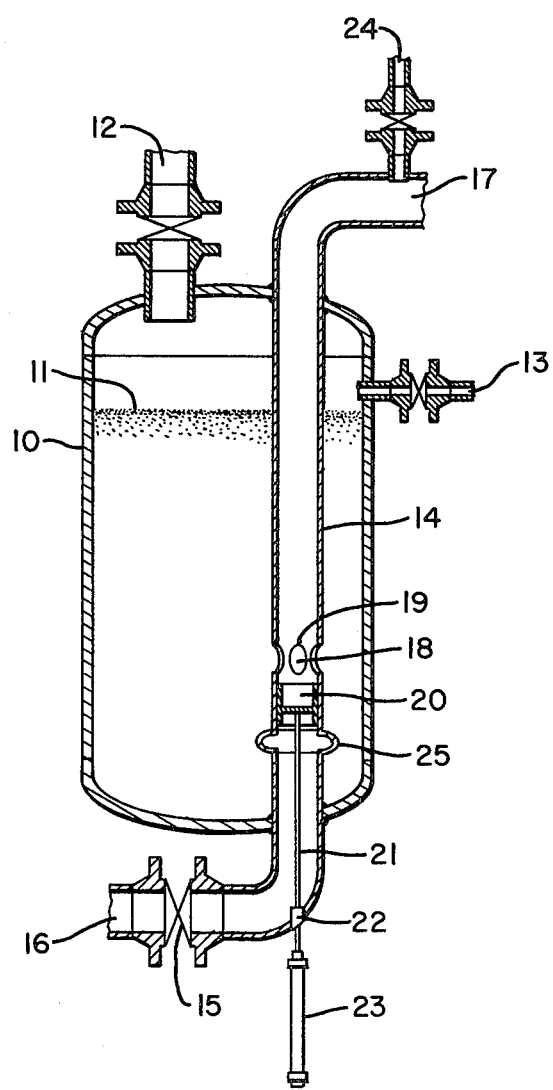

PNEUMATIC CONVEYING SYSTEM

BACKGROUND OF THE INVENTION

As is known, pneumatic conveying systems for solid fuel particles and the like have been proposed wherein a conveying pipe is provided with an opening embedded in solid particulate fuel carried within a pressurized tank. Particulate fuel entering the pipe is forced through the pipe by an air blast; and as the fuel is conveyed from the opening, a new supply is forced into the opening by air pressure above the particulate fuel.

In a typical case, the opening in the conveying pipe takes the form of a nozzle assembly. That is, the aforesaid air blast is supplied by a vertically-adjustable conduit extending through the bottom wall of the pressurized tank. An open-ended pipe of the same size is disposed axially above the top of the conduit and serves to convey the fuel, typically ground and dried coal, to a gasifier. The bottom conduit is usually adjustable up to about 50 millimeters; while the lower end of the upper conveying pipe is in the form of a cone. In this manner, the lower conduit is adjustable axially between a position in which a hermetic seal is produced between the conduit and the pipe and a position in which the opposed open ends are at a specific distance from one another such that the fine-grained material is fed, by pressure within the tank, to the conveying pipe leading to a gasifier.

In the event of a disturbance in the gasifier to which the fine-grained fuel is fed, it becomes necessary to seal off the conveying pipe. The relatively adjustable ends of the pipes of a nozzle assembly of the type described above do not sufficiently or reliably satisfy such a requirement. That is, if the fine-grained material being conveyed has an eroding action (e.g., a fine-grained coal having a considerable proportion of coke), then extensive wear of the mating parts of such an assembly will occur; and this impairs the reliability of the closure and necessitates frequent renewal of parts.

SUMMARY OF THE INVENTION

In accordance with the present invention, a new and improved conveying pipe arrangement is provided for pneumatic conveying systems which is highly reliable and in which wear is minimized, thereby obviating the necessity for frequent replacement of parts.

Specifically, there is provided, in a pneumatic conveying system, a conveying pipe extending through a pressurized storage tank filled with fine-grained material. Ports are provided in the side wall of the conveying pipe through which fine-grained material is forced by pressure within the storage tank. One end of the conveying pipe is connected to a source of gas under pressure whereby the pressurized gas in the conveying pipe will convey particulate material entering through the aforesaid ports. A cylindrical valve member bears against the inner wall of the conveying pipe and is movable from a position where it closes the aforesaid ports to a position where it exposes the ports. Preferably, the edges of the aforesaid ports in the conveying pipe are provided with a metal hard-facing material. The materials used for hard facing and for the cylindrical valve member must be such that the cylindrical valve member will provide an adequate seal without jamming, even under varying temperature conditions.

In order to allow for inevitable temperature variations in the pressure tank and the conveying pipe, an expansion joint is provided in the pipe inside the tank. This permits movement between the pressurized tank and the conveying pipe leading to the gasifier and compensates for changes in shape of the wall of the pressurized tank due to variations in the pressure therein. When fine-grained coal is fed to a gasifier, for example, pressure differences of 40 bar and temperature differences of 150 K can be expected.

To actuate the valve member between open and closed positions, a pneumatic cylinder is provided which is disposed outside the pressurized tank and is provided with a piston rod which extends into the conveying pipe and is connected to the valve member.

The above and other objects and features of the invention will become apparent from the following detailed description taken in connection with the accompanying single FIGURE drawing which schematically illustrates one embodiment of the invention.

With reference now to the drawing, a pressurized tank is designated generally by the reference numeral 10. The tank is filled with fine-grained fuel, such as coal, the upper surface of the fuel being identified by the reference numeral 11. The space above the surface 11 is pressurized through a valve connected to a conduit 13 leading to a source of air under pressure, not shown. Particulate material may be fed into the tank through a valve leading to a conduit 12 connected to the bottom of a hopper or the like.

Extending through the tank 10 is a pneumatic conveying pipe 14 which is welded to the top and bottom walls thereof. Connected to the lower end of the conveying pipe 14 via valve 15 is a conduit 16 connected to a source of propellant gas, not shown. Conveying pipe 14 is connected to a conduit 17 leading to a coal gasifier or the like, not shown. Additional propellant gas under pressure may be fed into the conduit 17 from conduit 24 via a valve.

In the side wall of the conveying pipe 14 are ports 18 embedded in the fine-grained fuel contained within the tank 10. Under the pressure exerted above the surface 11, the fine-grained fuel enters the ports 18 and is thereafter conveyed through pipe 14 and conduit 17 to the aforesaid gasifier under an air blast supplied via conduit 16. Within the conveying pipe 14 and beneath the ports 18 is an annular valve member 20 connected through piston rod 21, which passes through seal 22, to a pneumatic or hydraulic cylinder 23. With this arrangement, the annular valve member 20, which abuts the inner periphery of the conveying pipe 14, can be moved from the position shown in the drawing upwardly to the point where it covers the ports 18, thereby cutting off the supply of fine-grained fuel into the pipe 14. Downward movement of the valve 20 from its upper position where it covers the ports 18 will, of course, permit fine-grained fuel to again enter the ports 18 where it is conveyed upwardly by an air blast from conduit 16, this air blast passing through the annular or hollow valve member 20. The edges of the ports 18 are provided with a metallic hard-facing material 19 to prevent excessive wear around the edges from particulate material passing therethrough and, at the same time, will permit easy sliding movement of the valve 20 upwardly or downwardly.

As will be appreciated, the pneumatic conveying pipe 14 will expand or contract in response to temperature and pressure variations. Accordingly, an expansion joint 25 is provided beneath the ports 18 to facilitate such expansion and contraction.

The present invention thus provides a means for pneumatically conveying fine-grained fuels which is inexpensive and reliable and which does not require frequent replacement of parts. Although the invention has been shown in connection with a certain specific embodiment, it will be readily apparent to those skilled in the art that various changes in form and arrangement of parts may be made to suit requirements without departing from the spirit and scope of the invention.

What is claimed is:

1. In a pneumatic conveying system, a conveying pipe extending upwardly through a pressurized storage tank filled with fine-grained material, means for supplying gas under pressure to said storage tank ports in the wall of said conveying pipe which are embedded in said fine-grained material and through which the fine-grained material is forced by the pressure of said gas within the storage tank, means connecting one end of said conveying pipe to a source of gas under pressure whereby the pressurized gas in the conveying pipe will convey particulate material forced into the pipe through said ports, and a cylindrical valve member which bears against the inner wall of the conveying pipe and is movable between a position in which it closes the ports to a position in which the ports are uncovered.

2. The conveying pipe according to claim 1 including metal hard facing on the edges of said ports.

3. The conveying pipe according to claim 1 including an expansion joint in said conveying pipe within said pressurized storage tank to facilitate thermal expansion and contraction of the conveying pipe.

4. The conveying pipe according to claim 1 including a fluid cylinder disposed outside the pressurized storage tank and provided with a piston rod connected through an opening in the storage tank to said cylindrical valve member.

5. The conveying pipe according to claim 1 wherein said cylindrical valve member comprises an annular valve member having an outer periphery abutting the inner periphery of said conveying pipe.

* * * * *